(12) United States Patent
Pirasteh et al.

(10) Patent No.: US 7,076,032 B1
(45) Date of Patent: Jul. 11, 2006

(54) METHOD AND SYSTEM FOR PROCESSING TELEPHONE CALLS BY IVR

(75) Inventors: Hassan Pirasteh, Jacksonville, FL (US); John Garrow, Jacksonville, FL (US); Shelly Grossmith, Jacksonville, FL (US); Khadim Hussain, Jacksonville, FL (US)

(73) Assignee: Convergys CMG Utah Inc., South Jordan, UT (US)

( * ) Notice: Subject to any disclaimer, the term of this patent is extended or adjusted under 35 U.S.C. 154(b) by 1014 days.

(21) Appl. No.: 09/593,795

(22) Filed: Jun. 14, 2000

(51) Int. Cl.
*H04M 11/00* (2006.01)
(52) U.S. Cl. ............... 379/88.18; 379/70; 379/265.02; 704/275
(58) Field of Classification Search ............ 379/88.18, 379/221.08, 265.01, 212.01, 265.02
See application file for complete search history.

(56) References Cited

U.S. PATENT DOCUMENTS

| | | | |
|---|---|---|---|
| 5,179,585 A * | 1/1993 | MacMillan et al. .... | 379/212.01 |
| 5,243,643 A | 9/1993 | Sattar et al. | |
| 5,255,305 A | 10/1993 | Sattar | |
| 5,416,830 A | 5/1995 | MacMillan et al. | |
| 5,479,487 A | 12/1995 | Hammond | |
| 5,572,570 A * | 11/1996 | Kuenzig ................... | 379/1.02 |
| 5,619,554 A * | 4/1997 | Hogan et al. ............ | 379/88.1 |
| 5,737,393 A | 4/1998 | Wolf | |
| 5,870,464 A * | 2/1999 | Brewster et al. ......... | 379/219 |
| 5,966,695 A | 10/1999 | Melchione et al. | |
| 6,011,844 A | 1/2000 | Uppaluru et al. | |
| 6,154,527 A * | 11/2000 | Porter et al. ............ | 379/88.18 |
| 6,311,164 B1 * | 10/2001 | Ogden ......................... | 705/7 |
| 6,389,126 B1 * | 5/2002 | Bjornberg et al. ..... | 379/201.03 |
| 6,480,599 B1 * | 11/2002 | Ainslie et al. ......... | 379/265.02 |

* cited by examiner

*Primary Examiner*—Fan Tsang
*Assistant Examiner*—Gerald Gauthier
(74) *Attorney, Agent, or Firm*—Frost Brown Todd LLC

(57) ABSTRACT

The present invention relates generally to voice response systems. Specifically, this invention relates to an interactive voice response client using script engines to control various voice processing systems. In a preferred embodiment, a customer dials a designated phone number and is connected to a main switch of the system. The switch sends a message pertaining to the call to a Computer Telephony Integration system, which in turn sends a signal to an IVR Engine. The IVR Engine is adapted to send and receive data from the caller. The IVR Engine also interacts with a Script Engine that is adapted to run any appropriate scripts, such as a script to apply business rules or logic. The Script Engine sends instructions to the IVR Engine, which are then passed on to the caller. Responses from the caller to the IVR may then be passed back to the Main Script Engine. This process repeats itself until all data is gathered or the call is terminated.

17 Claims, 3 Drawing Sheets

METHOD AND SYSTEM FOR PROCESSING TELEPHONE CALLS BY IVR

BACKGROUND AND SUMMARY OF THE INVENTION

The present invention relates generally to voice response systems. Specifically, this invention relates to an interactive voice response client using script engines to control various voice processing systems.

The development of interactive voice response systems has led to the creation of systems capable of interacting with parties to solicit information in an automated process. Traditionally, business logic for such applications was run on a mainframe. An IVR client would typically "screen-scrape" through the mainframe in order to interface with the agent. Every logic line therefore had to be written on both the mainframe and the IVR client, effectively requiring duplicate coding. The client would need to login to the mainframe, enter data in the mainframe screen and submit the data, monitor the response from the mainframe, and then interpret the data or response received.

It is therefore an object of the present invention to develop an IVR client system wherein logic coding on a main server may be used without the need for analogous logic coding on the client itself.

The present invention comprises a method for processing telephone calls using IVR. The method first involves automatically answering an incoming call. The call is then redirected to an appropriate IVR Engine. A signal is then sent from the IVR Engine to a Script Engine, whereby the Script Engine may run an appropriate script and send an instruction back to the IVR Engine. The IVR Engine then passes the instruction on to the caller. The IVR Engine collects any information provided by the individual in response to the instruction. If further data collection is needed, the information gathering process may repeat itself until all data is collected from the caller. Once all the data is gathered and, if necessary, processed by the Script Engine, an appropriate message is sent to the individual. The call is then terminated, either automatically or by the individual.

The present invention also includes a system for processing such a telephone call using IVR. The system includes a switch adapted to automatically answer and redirect an incoming call. An IVR Engine then receives the redirected call, and is adapted to send information to and receive information from the caller. The system also includes a Main Script Engine that is adapted to receive an instruction from said IVR Engine, execute an appropriate script, and return an instruction to the IVR Engine. The IVR Engine then uses this instruction to guide the interaction with the individual. The system may also include a data storage device for housing the information received from the caller.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
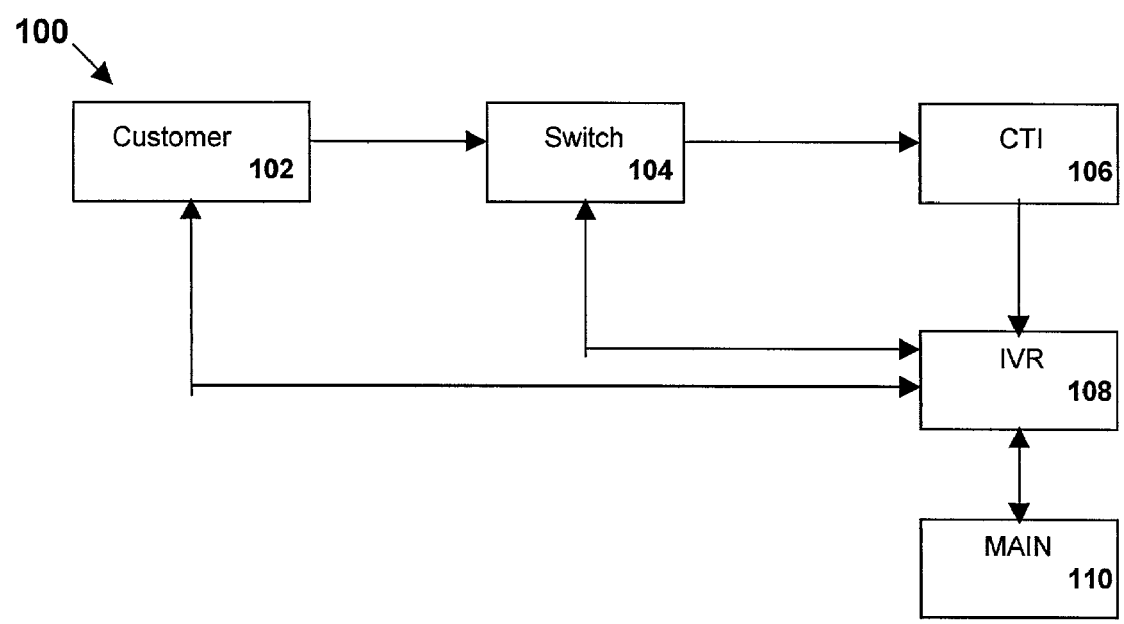
FIG. 1 is a schematic diagram of a preferred IVR system in accordance with the present invention.

The present invention is directed to a system for interfacing with a customer and collecting customer data. FIG. 1 shows a diagram of a preferred IVR system 100 of the present invention. A customer or caller 102 dials a designated phone number and is connected to a main switch 104. The switch then sends a message pertaining to the call to the CTI (Computer Telephony Integration) System 106. The CTI in turn sends a DNIS or other appropriate message or signal to the IVR Engine 108. The IVR Engine then preferably sends data back and forth with the caller. The IVR Engine also preferably sends a signal to the main system 110 to run the appropriate script. The main system 110 then sends an instruction to the IVR Engine 108 which is passed on to the caller 102. The response from the caller 102 to the IVR 108 is then passed on to the Main System 110. This process repeats itself until all data is gathered or the call is terminated.

Figure 2:
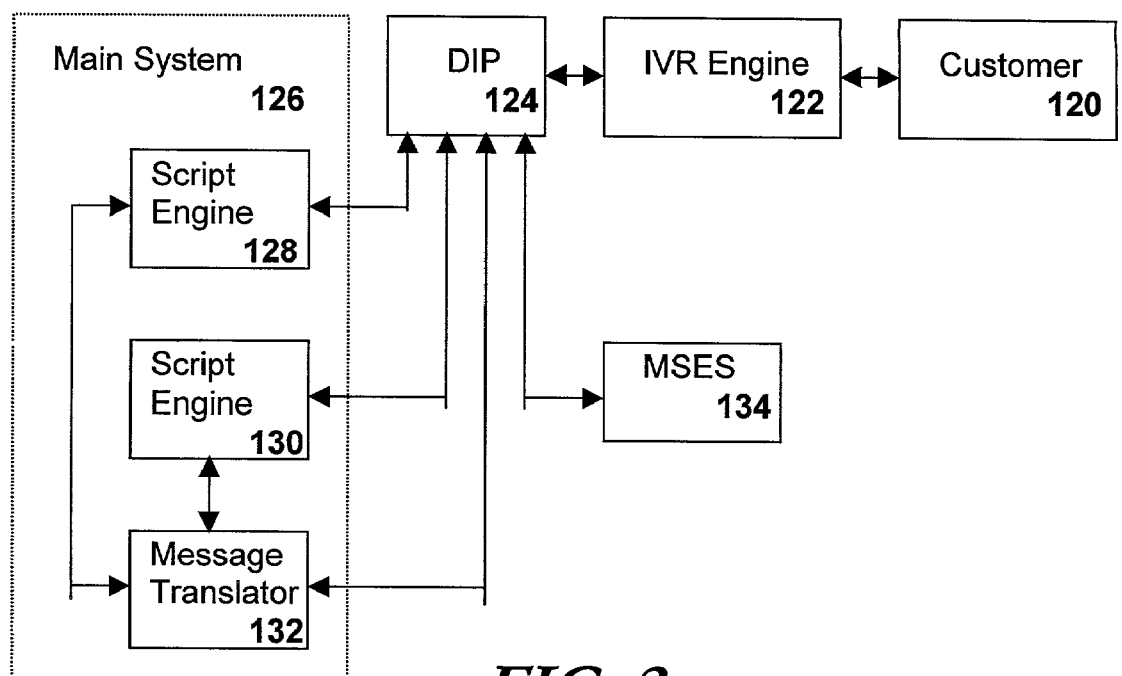
FIG. 2 is another schematic diagram of a preferred IVR system in accordance with the present invention.

FIG. 2 shows another view of a preferred system of the present invention. The IVR component architecture preferably contains five basic elements: the IVR Engine 122, the DIP 124, the Message Translator 132, the Main Script Engine Simulator, and the IVR administration tools.

The IVR Engine 122, an IVR application program residing on IVR machines, preferably executes IVR functionality (i.e., plays voice files and captures digits entered from telephone keypads) as directed by the DIP 124. The purpose of the IVR application is to provide a main system 126 access to functions unique to IVR, such as transfer of incoming calls. Execution of business logic will often be a function of such applications. The IVR engine may be derived from any appropriate engine or commercial application, such as Lucent Conversant IVR. A preferred embodiment runs on a UNIX machine connected to an Oracle database for data storage and retrieval, although any appropriate operating system or database may be used. Database scripting may utilize an appropriate commercial package, such as Lucent Script Builder, alleviating the need to generate completely original script. The IVR engine may also incorporate any appropriate voice generation/recognition software, such as Voice@Work. If an Internet or other browser-based client is desired, voice XML or other web-friendly software may be used to interface with a customer.

This IVR Engine preferably answers an incoming call and sends a message to transfer control to the DIP 124. Upon the receipt of a reply from the DIP, the IVR application may take whatever action is designated and send action complete messages back to the DIP with any collected data. Each new call preferably initiates a stream of messages that are processed back and forth between the IVR Engine and the DIP until the DIP sends the end call or transfer call message. If a caller hangs up before the IVR Engine receives and end call or transfer call message, the engine will preferably send a hang-up message to the DIP.

The DIP 124 is preferably the component on the IVR machine that connects the IVR Engine to the main system. It preferably relays messages between the appropriate Main Script Engine 128, 130 and the IVR Engine 122. The communication between the DIP and the Script engine preferably utilizes TCP-IP sockets. The DIP process may usually be started in an 'inittab' on the IVR machine and may be available to all projects on the main system. Once the IVR Engine receives a call, it preferably calls the DIP with client information. The DIP 124 preferably uses project configuration information to establish a connection to the socket on the appropriate Main Script Engine 128, 130. The DIP relays messages for the call flow from the Main Script Engine to the IVR Engine and any responses back to the Main Script Engine. There may also be messages originating on the IVR Engine 122 like alarms, which are transmitted to the appropriate Main Script Engine. The connection is preferably terminated either by a 'disconnect' or a 'transfer' message from the Main Script Engine call flow or a 'hang-up' message from the IVR Script Engine. The DIP may not store any business knowledge or script 'context' but preferably ensures that each instance of the IVR Engine connects to the corresponding Main Script Engine. It is preferably also able to handle unexpected conditions and re-start itself upon encountering otherwise unrecoverable problems.

The main system may be any appropriate system for warehousing data, applying business rules and logic, and returning data and analysis, such as an SAP system. The SAP or other server, in combination with the Main Script Engine, preferably houses the backend business rules and models and runs all common and/or predetermined APIs. The IVR client then preferably runs the appropriate script. There is then no need to create new logic for the IVR client, as the logic is simply copied from and run on the Main Script Engine.

For example, the Main Script Engine may tell the IVR to capture nine digits for a social security number. The Main Script Engine preferably makes the request in voice form, using the same backend logic. The IVR client then captures the information and sends it to the Main Script Engine, which then validates the data. This system does away with the need for the IVR client to do such data validation, etc. A pipeline, or socket interface, may be setup between the IVR unit box and the Main system or SAP server. Standard API dialog with predetermined parameters are then preferably written and implemented to interface with the backend business logic on the Main System through the Main Script Engine.

Required maintenance may then be limited primarily to the Main Script Engine. The time needed to develop the IVR client may also be about 10% of the time needed previously, as now the majority of the backend logic is stored and executed exclusively on the main system, not on the client itself. The Main system simply runs the presentation on the IVR client.

The Message Translator component preferably resides on the main system, interpreting incoming messages and translating outgoing messages. It preferably receives instructions from the Main Script Engine, formats the information and sends them on to the IVR DIP. Any response received from the DIP may then be parsed and forwarded to the Main Script Engine. The Message Translator preferably uses TCP-IP sockets to communicate with the IVR DIP.

The Main Script Engine Simulator ("MSES") 134 is a preferred component designed to simulate the Main Script Engine for testing the IVR Engine and the DIP. It may be used as a model to eventually interface the Main Script Engine with the IVR components. It preferably also uses TCP-IP sockets to communicate with the DIP.

The MSES program may handle simple scripts with sufficient capability to test all features supported by the IVR Engine. Once a call comes through and a connection is established to the MSES, it preferably initiates messages to the IVR DIP through the Message Translator based on a stored script. For the initial phase, it may maintain a sequential script without branching. The call may then be terminated by an appropriate message, such as 'disconnect' or 'transfer', based on the call flow or a 'hang-up' message from the IVR. Multiple instances of the MSES program are preferably able to run asynchronously and interface with an IVR instance. It may also enable the user to inspect the flow of messages to and from the program.

Various administration tasks may also need to be completed with the addition of each new IVR application. Application-specific speech and configuration files/tables are preferably setup for usage by the appropriate IVR components. Support may then be provided for recording script phrases and for administrative message coding. It should also be possible to retrieve customer recorded messages for transcription. Integrity of speech phrases and files across components may be ensured. IVR may utilize such information as incoming VDN, client name, and speech file to execute the appropriate application.

The system preferably includes a configuration file that maps the project id for the incoming Vector Directory Number (VDN) in the IVR Engine. It may also provide the IVR DIP with the location of the Script Engine for all supported projects. This will ensure execution of the appropriate script and successful communication between the IVR Engine and the Main Script Engine. Optionally, the configuration file may maintain version information that is used by the IVR DIP to ensure that the correct version of the script is being executed.

The configuration file preferably stores talkfile numbers associated with the project script and for voice coding, if applicable. In the case of a problem connecting to the Main Script Engine or an error condition, the IVR Engine may be provided with a default action to either disconnect the caller or transfer the call to an agent at the default transfer number. There may be a phrase associated with this action that is spoken to the caller before it is performed. Finally, the IVR DIP preferably uses the heartbeat interval field in the configuration file to send a heartbeat signal to the main system at that fixed interval and receive a response to ensure a reliable connection and recovery. A sample project entry in the configuration file may look as follows:

{
VDN=12345
PROJECT_ID=MAIN_PROJECT
HOST_NAME=maindom
VERSION=1.2.3
PHRASE_TALKFILE=123
VC_TALKFILE=234
DEFAULT_ACTION=TRANSFER
DEFAULT_PHRASE=Please hold while you are transferred to a rep.
DEFAULT_TRF_NUM=54321
HEARTBEAT=10
}

In this example, VDN refers to the incoming Vector Directory Number, PROJECT_ID holds project name information, HOST_NAME holds the TCP/IP host name, VERSION refers to the Main Script version, PHRASE_TALKFILE refers to the IVR Engine recorded speech file, VC_TALKFILE refers to the IVR Engine message coding speech file, DEFAULT_ACTION refers to the IVR Engine default action when instruction cannot be received from the main system, DEFAULT_PHRASE refers to the speech the IVR Engine plays for a default action, DEFAULT_TRF_NUM refers to the number to which the IVR Engine transfers callers for a default transfer, and HEARTBEAT refers to the time interval for sending and receiving heartbeats.

Figure 3:
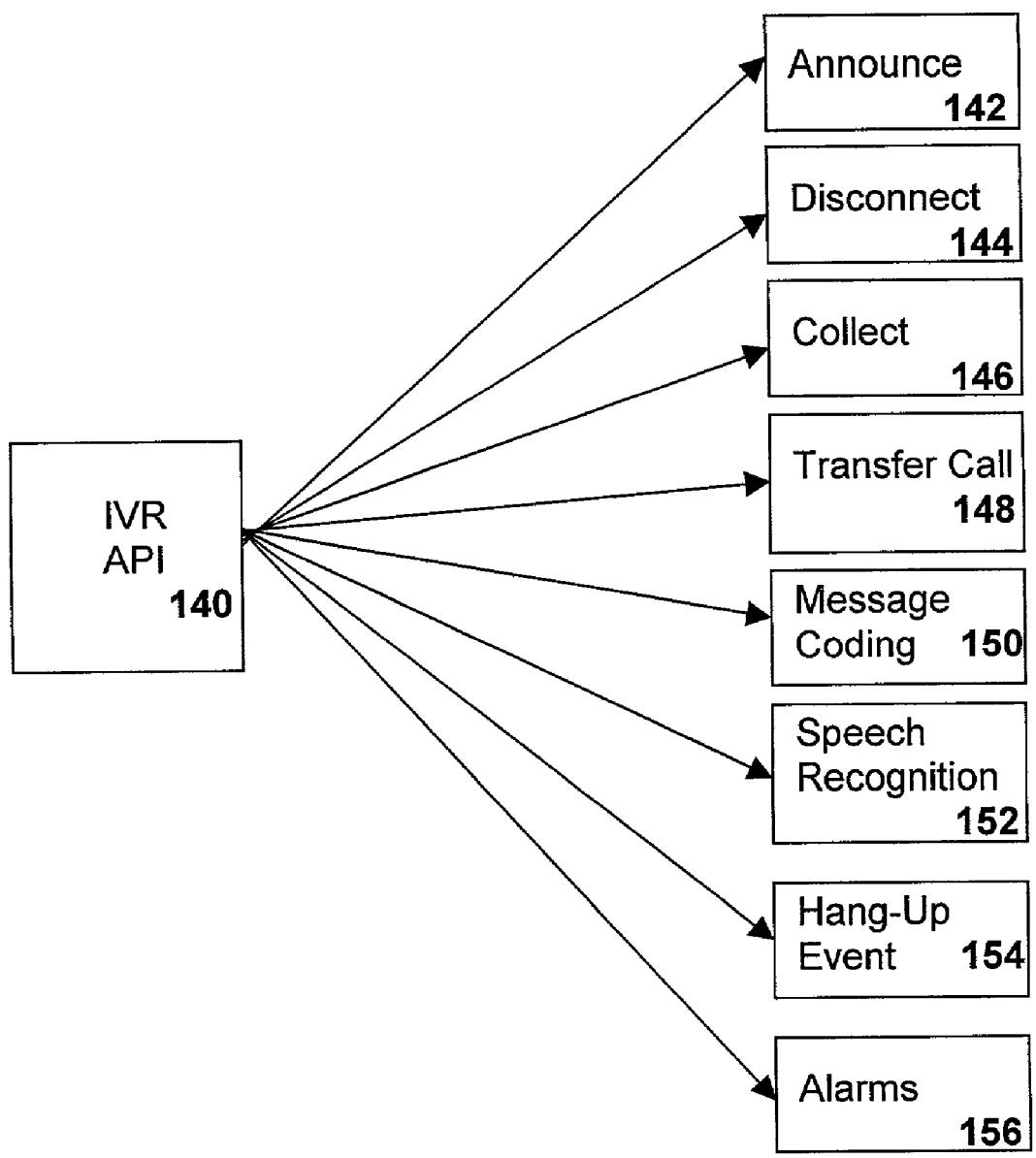
FIG. 3 is a schematic diagram of the preferred API functions in accordance with the present invention.

As shown in FIG. 3, the system also includes an IVR Applications Program Interface (API) 140. Several IVR functions may be included in the IVR API. Such functions preferably include, but are not limited to, announcing 142 or speaking a message to the caller; disconnecting 144 or placing the telephone on the hook; collecting 146 or accepting a response from the caller; transferring 148 the caller to another number (such as a customer service representative); recording a caller's speech, coding the message 150, and storing the message in the main system; speech recognition 152 (such as whole/flex word or text-to-speech); executing events for unexpected hang-ups 154; and activating alarms 156 for identification of application failure points. Other functions may include temporary IVR transaction suspension, call bridging, terminating one application and starting another without hanging up a call, auto-faxing, and multilingual capability.

Several messages may be sent from the Main Script Engine. Preferred messages include, but are not limited to, Announce, Collect, Transfer Call, Message Coding, Disconnect, and Error Condition.

The main purpose of the Announce function 142 is preferably the playing of messages to provide information to a caller. The message type is preferably specified as phrase, text, or field. The system may speak or play multiple phrases, field values, and/or lines of text. Although phrases are spoken as recorded and text is spoken as it appears in the text string, it is preferably possible to specify the format for the system to use when speaking a field value. The field format preferably determines the speech inflection and the interpretation of data, such as numbers used in money, dates, and times. Upon completion of an Announce function, the IVR preferably sends a message back to the Main Script Engine.

The main purpose of the Collect function 146 is preferably to obtain and pass information input from the caller to the Main Script Engine. It preferably collects caller input through the telephone keypad (touchtone) and/or speech recognition. The function may allow the specification of the caller input parameters and the recognition type for one of the optional speech recognition features. A preferred speech recognition module, such as WholeWord, preferably accepts spoken numbers, 0–9, and the words "yes" and "no".

Caller input parameters are preferably used to guide a caller to enter required data. A caller input field is preferably used to capture the data. Maximum digits, initial timeout and inter-digit timeout parameters are preferably determined from initial configuration, but may optionally be set in the message from the Main Script Engine. The Collect message may include phrase tags that play suitable messages to the caller prior to the actual Collect transaction. Upon completion of a Collect, the IVR preferably sends a message back to the Main Script Engine.

The Transfer Call message function 148 is preferably used to transfer the caller to another telephone number. Typically, the transfer is to a customer service representative. The preferred types of transfers supported by the IVR Engine are blind, transfer connect, and CTI transfer.

In a blind transfer, the system preferably completes the call as soon as the extension is dialed without waiting to determine if the third party is busy or answers. If the third party is busy or no one answers, the original caller normally typically hears a busy or ringing tone. It is typically not possible to reconnect the caller in these cases. Error conditions are usually not tracked even if they are returned to the call as there is no way to recover.

In a transfer connect, the system preferably waits for a connection to be established before completing a call. Any problems with the call like hardware/software/dial errors, timeout due to lack of call progress, illegal dial string or lack of dial tone at transfer are preferably relayed back to the calling application for appropriate action.

A CTI (Computer Telephony Integration) transfer preferably allows transferring the call and simultaneously passing additional information about the call to an external system using CTI. The information may be passed in any appropriate way, such as in an Electronic Folder. The Electronic Folder preferably holds information from the time a call comes in until the call is terminated. This information may be presented to the application and then to the agent. Data temporarily stored in the folder may include such information and the caller's account number, PIN number, address, social security number, and agent information.

A Transfer Call message may include a phrase tag(s) that plays a suitable message(s) to a caller before the transfer. An appropriate return value is preferably then sent back to the Main Script Engine. It might indicate whether the transfer was successful, depending upon the type of transfer.

The Message Coding function 150 is preferably sent from the Main Script Engine to the IVR Engine to record speech from the caller. The message(s) is preferably preceded by a spoken phrase(s) to the caller to record at the beep. The IVR Engine then preferably plays a beep or other audible indicator to prompt the caller to start recording. The message length allowed, the talkfile, initial timeout, and completion timeout values may all be picked up from initial configuration, but may be optionally set in the message. Again, the phrase number for each recording may be the next available number from the talkfile or sent as part of the message. Message coding information, including phrase number, machine name, and talkfile are then preferably sent back to the Main Script Engine if successful. A return value may also be sent to indicate whether the recording was successful.

Coded messages may be retrieved (e.g., for transcription of message of the day) as a special Announce message from the Main Script Engine to the IVR Engine. The Announce message preferably includes the machine name, talkfile, and phrase tag(s)/phrase number(s).

Message coding is preferably of two different types: messages recorded by the caller (such as fulfillment information) and administrative messages (of the "message of the day" kind). Customer-recorded messages may remain on and be retrieved from the machine where they were recorded. Thus, the machine name may have to be passed to the Main components along with the rest of the message information. The machine name would then preferably be returned along with the other phrase details to the IVR engine for transcription. Administrative messages may have to be distributed to all Voice Response machines for the project and be available for announcement.

The Disconnect function 144 is preferably used to direct the IVR Engine to disconnect the system from the caller. The IVR Engine may then be freed up to perform housekeeping or other functions before terminating itself. An appropriate phrase(s) may be passed with the Disconnect message to be played back to the caller before hanging up.

The Error Condition function preferably sends any problem in the Main Script Engine back to the IVR Engine. Typically, this would be a condition that triggers an alarm from the Main System to any monitoring system used. The message preferably includes information about the seriousness of the error condition (major, minor, or informational), mutually designated message ids and possibly a phrase tag(s) (or number(s) designating a phrase) that may have to be played back to the caller.

The IVR Engine, on receiving the call from the switch, preferably sends the Initialize message to the Main Script Engine. This is the preferred point of transferring control of the call flow to the Script Engine. The routing of the message to the correct instance of the Script Engine is preferably controlled by the DNIS/VDN information of the incoming call, which is passed to the IVR DIP. The IVR DIP may use lookup configuration tables to route the messages appropriately. A return value is then preferably sent back to the IVR Engine to indicate whether the connection was successful.

The Hang-Up Event function 154 preferably sends a message from the IVR Engine to the Main Script Engine to notify the main system that the customer has hung up on the call. This enables both the engines to perform housekeeping functions and terminate the call and call flow respectively.

The Alarm function 156 preferably sends an error condition in the IVR Engine back to the Main Script Engine. Typically, this would be a condition that triggers an alarm from the IVR to any monitoring system used. The message preferably includes information about the seriousness of the error condition, mutually designated message ids, and possibly a message string with additional useful information.

The Heartbeat function preferably sends a message from the IVR DIP with information about the 'health' of the IVR system at pre-set time intervals to the Main Script Engine. A reply with an appropriate return value at a pre-determined time interval is then preferably expected back to determine if the Script Engine is working normally.

A preferred layout exists for messages passed between the IVR Engine and the Main Script Engine. This preferred message structure provides flexibility in constructing and interpreting messages at either end of the system. Each message preferably includes a series of sections, some of which are optional. Each section preferably has a label that identifies the start of the section. While the size and layout of some section(s) may be fixed, other sections may store variable length data. The message structure may assume that all data, including the cache, consists of ASCII characters. The preferred message sections include the Header, the Data, the Cache, and the End of Message sections.

The Header section preferably contains the identity of the project the call belongs to, the type of message, and information for interpreting other sections of the message. The header fields are preferably fixed in length and extend to a length of about 35 bytes. The fields preferably post-fill with spaces if the size of the data is less than the field length. Preferred fields include HDR_LABEL, PROJECT_ID, MESSAGE_TYPE, FIELD_DELIMETER, and RETURN_CODE. The HDR_LABEL field preferably indicates the beginning of the header section and preferably has a constant value, such as "HDR". The PROJECT_ID field preferably has the value that is used in the system, such as in the configuration file, to uniquely identify the project. The preferred valid types for the MESSAGE_TYPE field are Star Script, Collect, Message Coding, Transfer, Disconnect, Error, Alarm, Hang-Up, and No Action Type. The FIELD_DELIMITER may contain any character that does not occur in any of the other fields in the message, especially in the data section. The RETURN_CODE field may mainly be used by the IVR Engine to indicate success or failure in performing the message instruction sent from the Main Script Engine.

The Data section preferably contains the actual data component of the message. For messages sent from the Main Script Engine, this section preferably contains the next set of instructions to be performed in the IVR Engine. Messages from the IVR Engine preferably include data collected as a response to these instructions or any additional information sent to the Main Script Engine. The fields in this section are preferably DATA_LABEL, FIELD_DELIMITER, DATA_MSG_FUNCTION, and DATA_MSG_PARAMS. The size of this section is preferably variable, depending on the size of data in the DATA_MSG_PARAMS.

The DATA_LABEL field preferably indicates the start of the Data section. For messages from the Main Script Engine, it preferably has an appropriate value, such as "DIN". Outgoing messages from the IVR Engine have a corresponding value, such as "DOT". For messages from the Main Script Engine, this section may be mandatory as it carries the next set of instructions to be executed by the IVR Engine. It is optional for messages from the IVR Engine, and may be present only when it collects data, usually from the caller such as in the DATA_MSG_PARAMS field, that has to be passed on to the Script Engine.

This section preferably includes three functions: Options, Announce, and the function specified in the MESSAGE_TYPE field in the Header section. The Options and Announce functions may be available only to messages from the Main Script Engine. The MESSAGE_TYPE field should preferably be included for all message functions that have valid DATA_MSG_PARAMS fields. The number of items in the Options and Announce lists may be set to zero. Message functions that do not require any data to be passed to them may not have the MESSAGE_TYPE field in this section. For the same message type, the data parameters under DATA_MSG_PARAMS may be different, depending on whether the data section is "DIN" or "DOT". If the section has an Options function, the sub-section with its parameters is preferably the first one. Similarly, the subsection with the MESSAGE_TYPE function, if present, is preferably the last one in the set of subsections. This implies that the Announce subsection, if it exists, preferably precedes the MESSAGE_TYPE subsection but follows the Options subsection.

The Cache section preferably has data that may be required by the Main Script Engine for successfully navigating the script flow. This may include 'context' information for establishing the current position of the script flow. This information is preferably not used at all by the IVR Engine but simply collected and sent back to the Main Script Engine with the response to the message. The pre-defined fields in this section are preferably separated from each other using the FIELD_DELIMITER value specified in the Header section. The preferred fields in this section include CACHE_LABEL, FIELD_DELIMITER, CACHE_DATA_SIZE, AND CACHE_DATA. The size of the section may be variable, preferably depending on the size of data in the CACHE_DATA field. The CACHE_LABEL field preferably indicates the start of the Cache section and has an appropriate value such as "CAC". This section may be optional. The Main Script Engine may determine whether or not it needs a placeholder on the message to store any data it needs. The IVR engine may copy this section from each incoming message without changes to any messages it sends out before the next incoming message. The size of the CACHE_DATA filed preferably matches the value in the CACHE_DATA_SIZE field. It may be used to provide independent confirmation of the receipt of the complete message.

The END_OF_MESSAGE section preferably marks the end of the message. It may be used to verify that the complete message has been received at either end of the system. The only field preferred to be in this section is EOM_LABEL. The EOM_LABEL field preferably has an appropriate consistent value, such as "END".

The Announce and Options Message Functions may be combined for use with existing message types or used by themselves. To avoid ambiguity, the No Action message type may be available for use with the Announce and Options message functions to indicate that no further action, other than the actual announce and/or options function execution, is necessary by the IVR Engine.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for processing telephone calls using IVR, said method comprising the steps of:
    (a) automatically answering a call from an individual and redirecting said call to an IVR Engine;
    (b) sending a signal from said IVR Engine to a Script Engine via a Data Interface Process (DIP), whereby said Script Engine may select an appropriate script and send an instruction and the selected script back to said IVR Engine;
    (c) passing said instruction from said IVR Engine to said individual;
    (d) collecting input from the individual given in response to the instruction; and
    (e) sending the collected input from said IVR Engine to said Script Engine via said Data Interface.

2. The method according to claim 1 further comprising applying business rules and logic to the collected input on said Script Engine.

3. The method according to claim 1 further comprising utilizing project configuration information in the Data Interface Process to establish a connection between said IVR Engine and an appropriate said Script Engine.

4. The method according to claim 1 further comprising warehousing the collected input by said Script Engine.

5. The method according to claim 1 wherein selecting the script further comprises executing appropriate Application Programming Interfaces (APIs) for the call.

6. The method according to claim 1 wherein validating the collected input on said Script Engine.

7. The method according to claim 1 further comprising translating between said Data Interface Process and said Script Engine.

8. The method according to claim 1 further comprising generating an electronic folder for each call, said electronic folder adapted to house any information pertinent to said call.

9. A system for processing a telephone call from an individual using IVR, said system comprising:
    (a) a switch adapted to automatically answer and redirect the telephone call;
    (b) an IVR Engine adapted to accept the telephone call redirected by said switch, said IVR Engine adapted to receive and perform a script per an instruction, and to send outgoing information to and receive incoming information from said individual in accordance with the script;
    (c) a Main Script Engine adapted to receive an instruction from said IVR Engine, to select a script, and to return the instruction to said IVR Engine; and
    (d) a data interface process (DIP) adapted to interface between said IVR Engine and said Script Engine, wherein the DIP is adapted to send the collected input from said IVR Engine to said Script Engine.

10. A system according to claim 9 additionally comprising a data storage device coupled to said Main Script Engine for housing the incoming information received from the individual.

11. The system according to claim 9 further comprising a Computer Telephony Interface adapted to connect and communicate between said IVR Engine and said switch.

12. The system according to claim 9 further comprising a main system, which includes said Script Engine, adapted to warehouse the incoming information, to apply business rules and logic to the incoming information, and to return data and analysis of the incoming information.

13. The system according to claim 9 wherein said Script Engine is adapted to execute data validation of the incoming information.

14. The system according to claim 9 wherein the Data Interface Process further comprises a socket interface between said IVR Engine and said Script Engine.

15. The system according to claim 14 wherein said socket interface comprises a TCP-IP socket.

16. The system according to claim 9 further comprising a Message Translator responsive to said Script Engine and configured to interpret the incoming and outgoing information.

17. A system according to claim 9 additionally comprising a Script Message Emulator, said Script Message Emulator configured to provide a predetermined script to simulate said Script Engine and to interface with said IVR Engine.

* * * * *